(12) United States Patent
Szalony et al.

(10) Patent No.: US 10,458,752 B1
(45) Date of Patent: Oct. 29, 2019

(54) FOLDED RELAY SPRING FOR OPTICAL SIGHT

(71) Applicant: Trijicon, Inc., Wixom, MI (US)

(72) Inventors: Steven C. Szalony, Fowlerville, MI (US); Ian Doran, Walled Lake, MI (US); Rodney DeLaca, Canton, MI (US)

(73) Assignee: Trijicon, Inc., Wixom, MI (US)

( * ) Notice: Subject to any disclaimer, the term of this patent is extended or adjusted under 35 U.S.C. 154(b) by 0 days.

(21) Appl. No.: 16/045,190

(22) Filed: Jul. 25, 2018

(51) Int. Cl.
    *F41G 1/38*      (2006.01)
    *G02B 7/10*      (2006.01)
    *G02B 15/163*      (2006.01)

(52) U.S. Cl.
    CPC ............. *F41G 1/38* (2013.01); *G02B 7/10* (2013.01); *G02B 15/163* (2013.01)

(58) Field of Classification Search
    CPC ........................................................ F41G 1/38
    USPC ............... 42/122, 135, 119, 120, 123, 130; 359/429, 427, 418, 422, 428, 424
    See application file for complete search history.

(56) References Cited

U.S. PATENT DOCUMENTS

| | | | |
|---|---|---|---|
| 2,150,629 A | 3/1939 | Mossberg | |
| 2,155,390 A | 4/1939 | Arden | |
| 2,180,184 A | 11/1939 | Weaver | |
| 2,355,384 A | 8/1944 | Litschert | |
| 2,496,045 A | 1/1950 | Ford | |
| 2,858,732 A | 11/1958 | Kollmorgen | |
| 2,913,826 A | 11/1959 | Petty | |
| 2,948,188 A | 8/1960 | Kollmorgen | |
| 2,949,816 A | 8/1960 | Weaver | |
| 2,955,512 A | 10/1960 | Kollmorgen et al. | |
| 2,997,916 A | 8/1961 | Friedman et al. | |
| 3,161,716 A | 12/1964 | Burris et al. | |
| 3,297,389 A | 1/1967 | Gibson | |
| 3,484,148 A * | 12/1969 | Gotoh ................. | F41G 1/38 356/247 |
| 3,506,330 A | 4/1970 | Allen | |
| 3,510,192 A | 5/1970 | Akin, Jr. et al. | |
| 3,962,795 A | 6/1976 | Ross | |
| 4,200,355 A | 4/1980 | Williams, Jr. | |
| 4,247,161 A | 1/1981 | Unertl, Jr. | |

(Continued)

FOREIGN PATENT DOCUMENTS

DE            29504498 U1      5/1995

*Primary Examiner* — Reginald S Tillman, Jr.
(74) *Attorney, Agent, or Firm* — Harness, Dickey & Pierce, P.L.C.

(57) ABSTRACT

An optical sight includes a housing, a relay assembly, and a biasing element. The relay assembly has at least one optical element, a main tube, a track tube with at least one track, and a reticle assembly. The track tube is selectively rotatable relative to and about the main tube to adjust an axial position of the at least one optical element within the main tube along an axis that is substantially parallel to a longitudinal axis of the main tube. The reticle assembly further includes at least one optical element. The biasing element includes a mounting strap that is fixed to an inner surface of the housing and a spring having an engagement surface that contacts the relay assembly and exerts a force on the relay assembly. The engagement surface is on a radially inner side of the spring opposite a radially outer side facing the mounting strap.

11 Claims, 8 Drawing Sheets

(56) References Cited

U.S. PATENT DOCUMENTS

| | | | |
|---|---|---|---|
| 4,255,013 A * | 3/1981 | Allen | F41G 1/38 |
| | | | 356/247 |
| 4,389,791 A | 6/1983 | Ackerman | |
| 4,403,421 A | 9/1983 | Shepherd | |
| 4,982,502 A | 1/1991 | Weyrauch | |
| 4,998,811 A | 3/1991 | Basta | |
| 5,020,892 A | 6/1991 | Glover et al. | |
| 5,363,559 A | 11/1994 | McCarty | |
| 5,499,456 A | 3/1996 | Tomita | |
| 5,615,487 A | 4/1997 | Tomita | |
| 5,745,287 A | 4/1998 | Sauter | |
| 6,351,907 B1 * | 3/2002 | Otteman | F41G 1/38 |
| | | | 42/120 |
| 6,513,251 B2 | 2/2003 | Huang et al. | |
| 6,640,481 B1 | 11/2003 | Williams, Jr. | |
| 6,691,447 B1 | 2/2004 | Otteman | |
| 6,995,905 B2 | 2/2006 | Wagner | |
| 7,944,611 B1 | 5/2011 | Regan et al. | |
| 8,314,994 B1 | 11/2012 | Thomas et al. | |
| 8,336,776 B2 | 12/2012 | Horvath et al. | |
| 8,379,307 B2 | 2/2013 | Thomas et al. | |
| 8,407,926 B2 | 4/2013 | Jung et al. | |
| 8,749,887 B2 | 6/2014 | Jahromi | |
| 9,062,934 B1 | 6/2015 | Presley et al. | |
| 9,383,166 B2 | 7/2016 | Jahromi | |
| 9,625,235 B2 | 4/2017 | DeLaca et al. | |
| 9,797,683 B2 | 10/2017 | Tang | |
| 2010/0325934 A1 * | 12/2010 | Liu | F41G 1/35 |
| | | | 42/135 |
| 2018/0023922 A1 | 1/2018 | Walker | |
| 2018/0024376 A1 | 1/2018 | Dohr et al. | |

* cited by examiner

FOLDED RELAY SPRING FOR OPTICAL SIGHT

FIELD

The present disclosure relates to an optical sight and more particularly to a relay spring for an optical sight.

BACKGROUND

This section provides background information related to the present disclosure which is not necessarily prior art.

Optical sights are often used with firearms such as rifles and/or handguns to allow a user to more clearly see a target and aim the firearm at the target. Conventional optical sights include a series of lenses and/or other optical components that magnify an image and provide a reticle to allow a user to align a magnified target relative to a barrel of the firearm. Optical sights may include one or more adjustment mechanisms that allow for adjustment of a position of the reticle relative to the barrel of the firearm.

Optical sights may additionally include a relay assembly that allows a user to easily and reliably adjust a magnification of the optical sight. Such relay assemblies include a main tube supporting one or more optical elements (i.e., lenses) and a so-called "track tube" having one or more tracks or slots that slidably receive a bearing fixed for movement with at least one of the optical elements.

SUMMARY

This section provides a general summary of the disclosure, and is not a comprehensive disclosure of its full scope or all of its features.

An example optical sight according to the present disclosure may include a housing, a relay assembly, and a biasing element. The relay assembly further includes at least one optical element, a main tube, a track tube having at least one track, and a reticle assembly. The track tube is selectively rotatable relative to and about the main tube to adjust an axial position of the at least one optical element within the main tube along an axis that is substantially parallel to a longitudinal axis of the main tube. The reticle assembly further includes at least one optical element. The biasing element includes a mounting strap and a spring. The mounting strap is fixed to an inner surface of the housing and the spring has an engagement surface that contacts the relay assembly. The engagement surface is on a radially inner side of the spring opposite a radially outer side facing the mounting strap. The biasing element exerts a force on the relay assembly when the relay assembly is installed in the housing.

The optical sight may further include an adjustment assembly having at least one turret. The at least one turret may cooperate with the biasing element to adjust a position of the reticle assembly and the relay assembly.

The at least one turret may include a first turret and a second turret. The force exerted by the biasing element may be at a one-hundred thirty-five degree angle relative to the force exerted by the first turret and the force exerted by the second turret.

The engagement surface of the biasing element may contact the relay assembly at a one-hundred thirty-five degree angle with respect to a contact point between the relay assembly and the first turret and at a one-hundred thirty-five degree angle with respect to a contact point between the relay assembly and the second turret.

The mounting strap may be an arcuate-shaped plate having a plurality of apertures for receiving a plurality of fasteners to fix the mounting portion to an inner wall of the housing.

The spring may extend from a radially extending edge surface of the mounting strap and fold-over such that the spring extends back over itself and overlaps the mounting strap on an inboard side of the mounting strap opposite the inner wall of the housing.

The relay assembly may include a first end and a second end. The engagement surface may contact the reticle assembly on the first end of the relay assembly.

The relay assembly may include a first end and a second end. The first end may contact the engagement surface, and the relay assembly may pivot on the second end opposite the first end.

At least one turret of an adjustment assembly may cooperate with the biasing element to pivot the reticle assembly and the relay assembly with respect to the housing.

The at least one turret may be a first turret having a first adjustment screw that moves in a first direction orthogonal to a longitudinal axis of the housing. The first adjustment screw may exert a force on the reticle assembly which at least partially opposes the force exerted by the biasing element.

The at least one turret may include a second turret having a second adjustment screw that moves in a second direction orthogonal to the longitudinal axis of the housing and orthogonal to the first direction. The second adjustment screw may exert a force on the reticle assembly which at least partially opposes the force exerted by the biasing element.

An example biasing element for a relay assembly of an optical sight according to the present disclosure may include a mounting plate and a spring extending from the mounting plate. The mounting plate may fix the spring to an inner surface of a housing of the optical sight. The spring may include a free end having an engagement surface contacting the relay assembly. The spring may be folded such that the free end of the spring overlaps the mounting plate.

The mounting plate may mimic a shape of the inner surface of the housing.

The mounting plate may be arcuate-shaped.

The mounting plate may include a plurality of apertures for receiving a plurality of fasteners to fix the mounting plate to the inner surface of the housing.

The spring may be a cantilevered flat spring extending from the mounting plate.

The spring may be an expansion spring including a first leg and a second leg and may be folded such that the first leg overlaps the second leg via a bend in the spring.

The engagement surface may abut a reticle housing of a reticle assembly disposed on an end of the relay assembly.

The engagement surface may exert a force on the reticle assembly when the reticle assembly and the relay assembly are installed in the housing.

The engagement surface may cooperate with an adjustment assembly having at least one turret to adjust a position of the reticle assembly and the relay assembly within the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
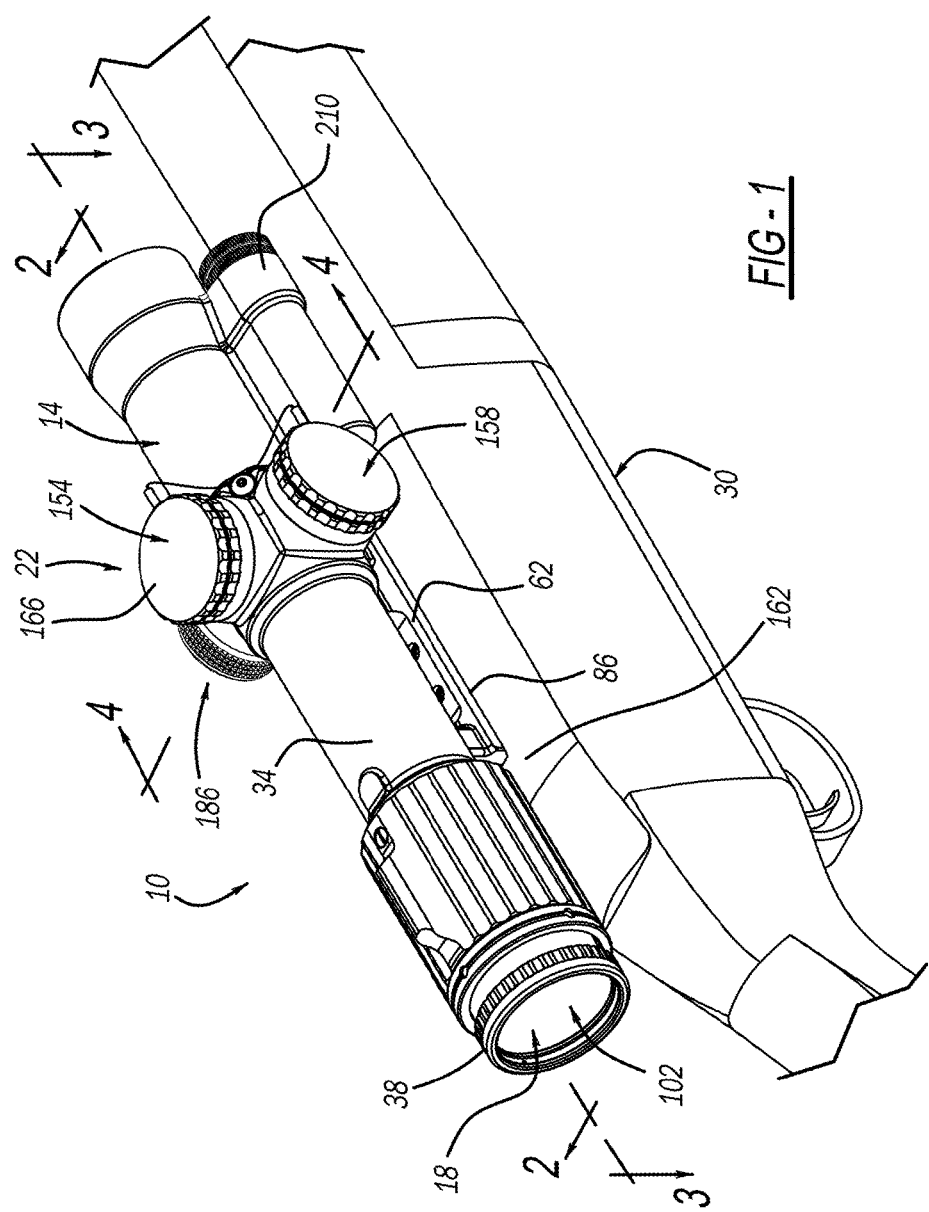
FIG. 1 is a perspective view of a firearm incorporating an optical sight in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
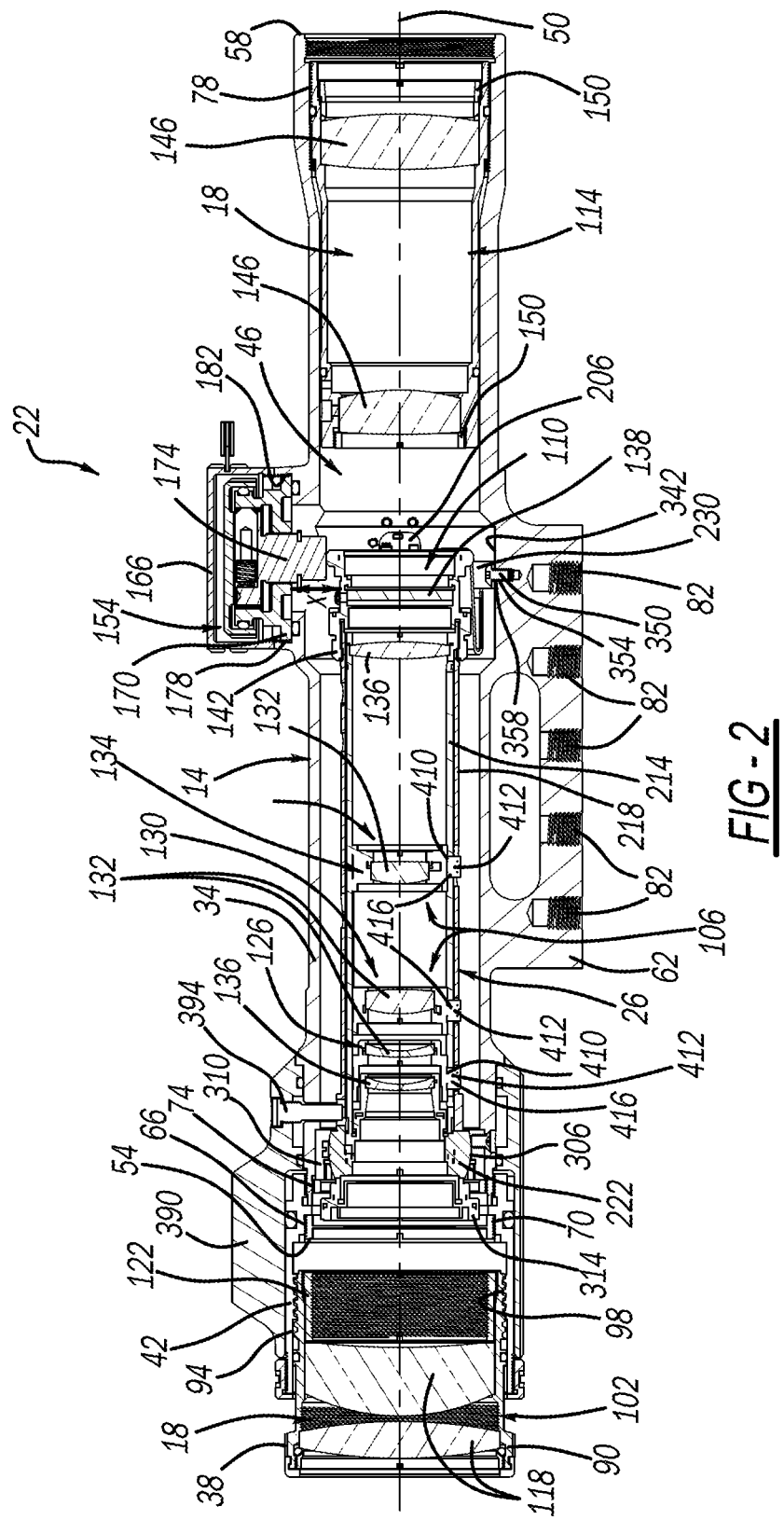
FIG. 2 is a cross-sectional view of the optical sight of FIG. 1 taken along line 2-2 of FIG. 1.
Figure 3:
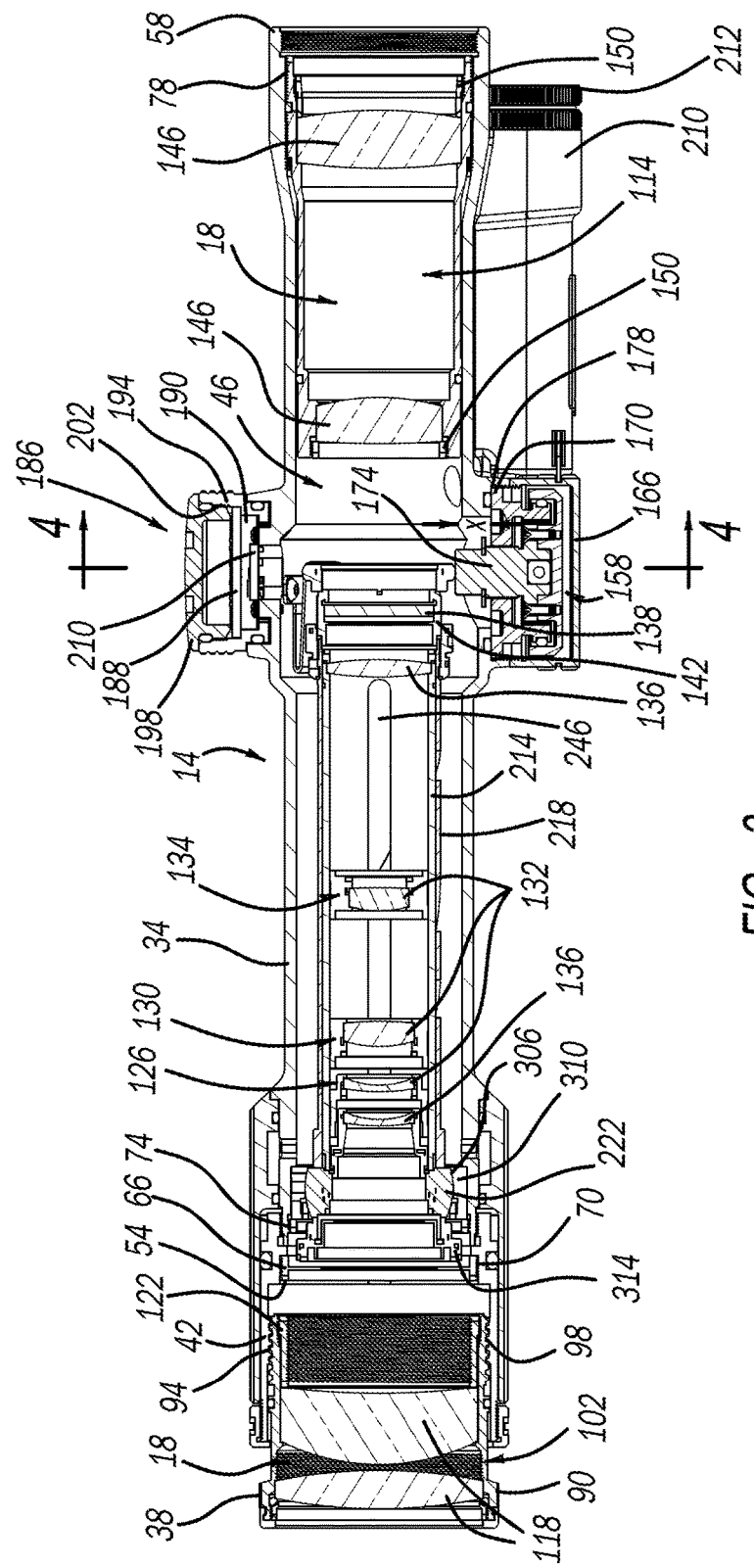
FIG. 3 is a cross-sectional view of the optical sight of FIG. 1 taken along line 3-3 of FIG. 1.

With reference to FIGS. 1-3, an optical sight 10 is provided and may include a housing 14, an optics train 18, an adjustment system 22, and a relay assembly 26. The housing 14 is removably attached to a firearm 30 and supports the optics train 18 and the adjustment system 22. The optics train 18 cooperates with the housing 14 to provide a magnified image of a target while the adjustment system 22 positions at least a portion of the optics train 18 and the relay assembly 26 relative to the housing 14 to properly align a reticle pattern (not shown) associated with the optics train 18 and the relay assembly 26 relative to the firearm 30. A light-emitting diode (LED; not shown) or other illumination system may cooperate with the optics train 18 to illuminate the reticle pattern to assist a user in aligning the target relative to the optical sight 10 and the firearm 30.

The housing 14 may be removably secured to the firearm 30 and includes a main body 34, an eyepiece 38, and an attachment collar 42 that secures the eyepiece 38 to the main body 34. The main body 34 may be a generally tubular member and includes an inner cavity 46, a longitudinal axis 50 extending between a first end 54 and a second end 58 of the housing 14, and a mounting portion 62 cooperating with a mount 64 (FIG. 5) for attaching the housing 14—via the main body 34—to the firearm 30.

As shown in FIG. 2, the first end 54 includes a series of threads 66 that cooperate with threads 70 of the attachment collar 42 to secure the attachment collar 42 to the main body 34 at the first end 54. The first end 54 additionally includes a series of threads 74 formed on an opposite side of the main body 34 at the first end 54 than the threads 66 such that the threads 74 oppose the inner cavity 46 of the main body 34. The second end 58 is disposed on an opposite end of the main body 34 than the first end 54 and includes an opening 76 having a series of internal threads 78. The internal threads 78 cooperate with a portion of the optics train 18 to retain the optics train 18 within the main body 34.

The mounting portion 62 is disposed along the longitudinal axis 50 and is located generally between the first end 54 and the second end 58. The mounting portion 62 may include a series of threaded bores 82 (FIG. 2) that cooperate with mount 64 (FIG. 5) to allow the optical sight 10 to be mounted to the firearm 30 at the mounting portion 62 of the housing 14. For example, the threaded bores 82 may receive fasteners 84 that pass through apertures in the mount 64 and affix the mounting portion 62 to the mount 64. In other embodiments, the threaded bores 82 may cooperate directly with a mounting feature 86 (FIG. 1) associated with the firearm 30 to allow the optical sight 10 to be mounted to the firearm 30 at the mounting portion 62 of the housing 14.

The eyepiece 38 is attached to the main body 34 at the first end 54 via the attachment collar 42, as described above. The eyepiece 38 includes a housing 90 having a series of external threads 94 and a series of internal threads 56. The external threads 94 engage internal threads 98 of the attachment collar 42 to permit adjustment of the eyepiece 38 relative to the main body 34.

The eyepiece 38 is positioned relative to the first end 54 of the main body 34 by the attachment collar 42 to allow the eyepiece 38 to support a portion of the optics train 18 relative to the main body 34 at a predetermined distance. Namely, and as shown in FIGS. 2 and 3, a portion of the optics train 18 is positioned a predetermined distance along the longitudinal axis 50 from the relay assembly 26 by the attachment collar 42.

Figure 4:
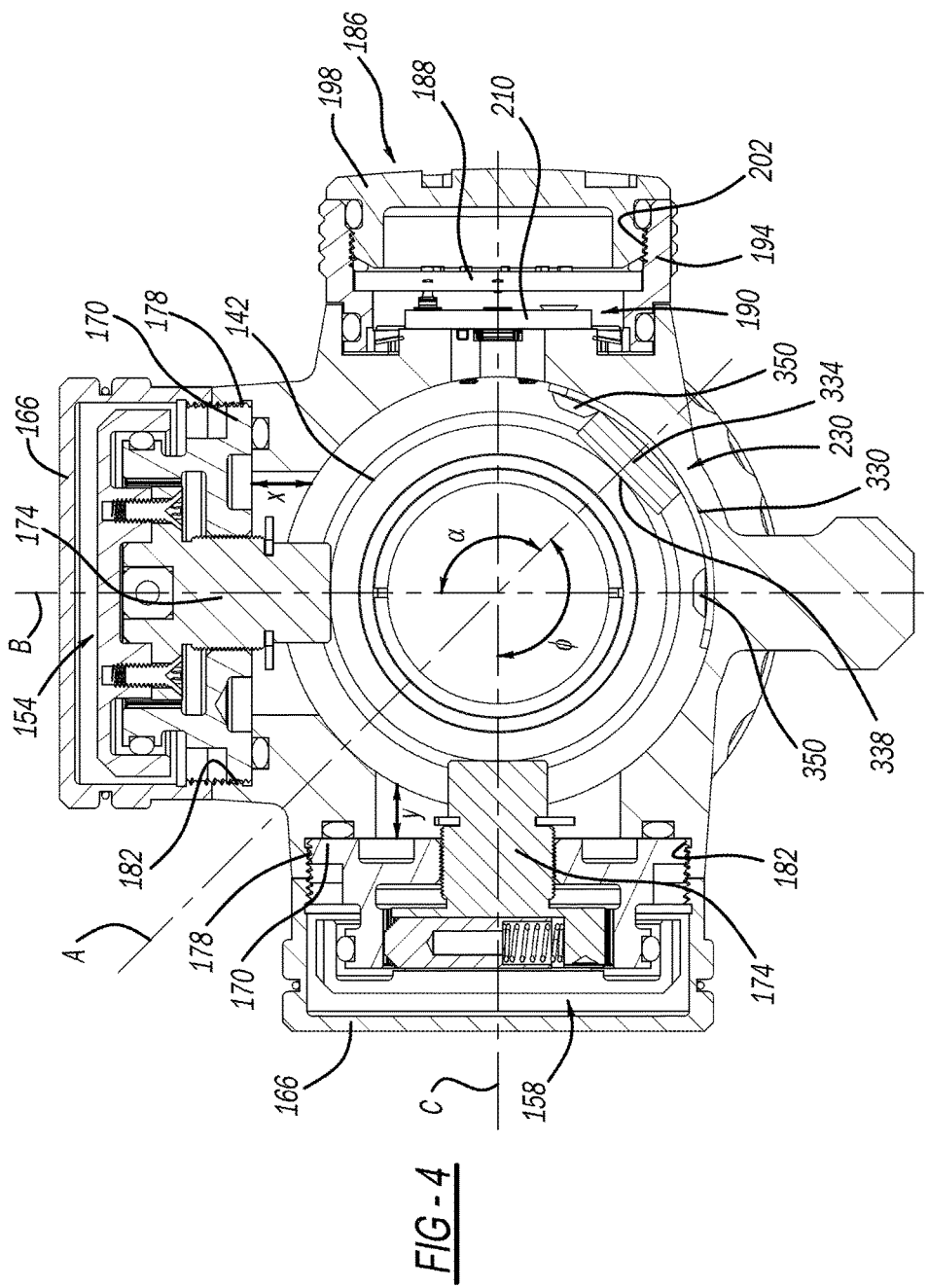
FIG. 4 is a cross-sectional view of the optical sight of FIG. 1 taken along line 4-4 of FIG. 1.

With particular reference to FIGS. 2-4, the optics train 18 is shown as including an ocular assembly 102, a zoom assembly 106, a reticle assembly 110, and an objective assembly 114. The ocular assembly 102 may include a series of lenses 118. The ocular assembly 102 may be supported by the eyepiece 38 relative to the main body 34 of the housing 14 by one or more retention collars 122. In one configuration, the retention collars 122 threadably engage the internal threads 56 of the eyepiece 38 to retain and position the lenses 118 of the ocular assembly 102 within the eyepiece 38.

The zoom assembly 106 is supported within the housing 14 of the optical sight 10 by the relay assembly 26 and may include a first relay lens assembly 126, a second relay lens assembly 130, a third relay lens assembly 134, and one or more stationary lenses 136. The first relay lens assembly 126, the second relay lens assembly 130, and the third relay lens assembly 134 may each include a lens (or a series of lenses) 132 that cooperate with one another and with the stationary lenses 136 to adjust a magnification of an image received by the housing 14 at the opening 76.

The reticle assembly 110 may include one or more reticle lenses 138 supported by a reticle-lens housing 142. The reticle-lens housing 142 is attached to and is supported by the relay assembly 26 within the inner cavity 46 of the main body 34. Accordingly, when the relay assembly 26 is moved relative to and within the inner cavity 46 of the housing 14, the lens 138 is likewise moved relative to and within the inner cavity 46. Because the lens 138 includes the reticle pattern inscribed thereon, movement of the reticle-lens housing 142 and the lens 138 relative to and within the inner cavity 46 of the housing 14 likewise adjusts a position of the reticle pattern relative to and within the housing 14. Further, because the housing 14 is fixed to the firearm 30 via the mounting portion 62 of the main body 34 and via the mount 64 and/or the mounting feature 86 of the firearm 30, adjustment of the reticle pattern relative to the housing 14 likewise adjusts a position of the reticle pattern relative to the firearm 30.

The objective assembly 114 may be disposed proximate to the second end 58 of the housing 14 and may include a series of objective lenses 146. The objective lenses 146 may be retained and supported within the housing 14 via at least one retention collar 150. In one configuration, the retention collar(s) 150 threadably engages the internal threads 78 of the opening 76 to position and retain the objective lenses 146 at a desired location along the longitudinal axis 50 of the housing 14.

The above description of the optics train 18 is provided to illustrate an exemplary configuration of optical components. The principles of the present disclosure are not limited in application to an optical sight having an optics train including the particular components and/or arrangement of components described above. The optical sight 10 may include any other configuration or arrangement of optical components to suit a given application and may provide the optical sight 10 with virtually any magnification.

With continued reference to FIGS. 2-4, the adjustment system 22 is shown to include first and second adjuster assemblies or turrets 154, 158. In one configuration, the adjustment turret 154 is positioned relative to and is supported by the housing 14 to allow the adjustment turret 154 to adjust a position of the reticle-lens housing 142 and, thus, the lenses 138, in a direction substantially perpendicular to the longitudinal axis 50 and in a direction (X), as shown in FIG. 2. Movement of the lenses 138 in the direction (X) likewise causes movement of the reticle pattern in the direction (X) which, in turn, adjusts a position of the reticle pattern relative to the firearm 30. Adjusting a position of the reticle pattern in the direction (X) adjusts a position of the reticle pattern in a direction toward or away from a top surface 162 of the firearm 30 and therefore adjusts the elevational position of the reticle pattern and allows a user to account for elevation when shooting at targets of different distances.

The adjustment turret 158 is positioned substantially perpendicular to the longitudinal axis 50 but is rotated about the longitudinal axis 50 ninety degrees (90°) relative to the adjustment turret 154. The adjustment turret 158 may likewise adjust a position of the reticle-lens housing 142 and associated lenses 138 relative to the housing 14 in a similar fashion as the adjustment turret 154. However, the adjustment turret 158 adjusts a position of the lenses 138 in a direction (Y; FIG. 3), which, in turn, moves the lenses 138 in a direction substantially ninety degrees (90°) relative to direction (X). Movement of the lenses 138 in the direction (Y) causes the reticle pattern to likewise move in the direction (Y) and substantially parallel to the top surface 162 of the firearm 30. Accordingly, the adjustment turret 158 allows a user to account for windage when using the optical sight 10 and firearm 30.

The adjustment turrets 154, 158 are substantially identical. Accordingly, only a description of the adjustment turret 154 is provided.

The adjustment turret 154 includes a cover 166, a main body 170, and an adjustment screw 174. The cover 166 is secured to the adjuster screw 174. Accordingly, when the cover 166 is rotated relative to the main body 170, the adjustment screw 174 likewise moves relative to the main body 170. Depending on the direction of rotation of the cover 166 relative to the main body 170, the adjustment screw 174 either moves along a direction (X) toward the reticle-lens housing 142 or away from the reticle-lens housing 142. The main body 170 rotatably supports the cover 166 relative to the housing 14 and also supports the adjustment screw 174 for movement in the direction (X) relative to the housing 14.

The main body 170 includes a series of threads 178 that matingly engage a threaded bore 182 of the main body 34. Engagement between the threads 178 of the main body 170 and the threaded bore 182 of the housing 14 attaches the main body 170 to the housing 14. Further, positioning the main body 170 relative to the main body 34 allows the adjustment screw 174 to extend into the inner cavity 46 of the housing 14, thereby allowing the adjustment screw 174 to contact the reticle-lens housing 142. As will be described in greater detail below, the reticle-lens housing 142 is biased into engagement with the adjustment screw 174 by the relay assembly 26.

The optical sight 10 may further include a brightness control assembly 186 for setting the brightness of the reticle. A brightness control knob board assembly 188 may be disposed within an inner cavity 190 of brightness control housing or brightness control knob 194 secured to the housing 14. A brightness electronics cover 198 may seal the inner cavity 190 of the brightness control knob 194 and may provide access to the brightness control knob board assembly 186. The brightness electronics cover 198 may engage (for example, by threads or otherwise) an annular surface 202 of the brightness control knob 194 defining the inner cavity 190. The brightness control knob board assembly 186 may be electrically connected to the reticle assembly 110 by a cable 206 (FIG. 2).

Additionally, a battery (not illustrated) for powering the reticle assembly 110 or any other portion of the optics train 18 may be disposed within an inner cavity (not illustrated) of a battery housing 210 secured to the housing 14. A battery cap 212 may seal the battery housing 210 and may provide access to the battery. The battery cap 212 may engage (for example, by threads or otherwise) an annular surface of the battery housing 194 defining the inner cavity. The battery may be electrically connected to and provide power to the reticle assembly 110 or other portion of the optics train 18 by a cable and/or contact sub assembly.

With particular reference to FIGS. 5-8B, the relay assembly 26 is shown and includes a main tube 214, a track tube 218, an end cap 222, and a biasing element 230. The main tube 214 slidably supports the first relay lens assembly 126, the second relay lens assembly 130, and the third relay lens assembly 134 therein for movement in a direction substantially parallel to the longitudinal axis 50, as shown in FIGS. 2 and 3. The main tube 214 additionally rotatably supports the track tube 218 within the inner cavity 46 and allows the track tube 218 to be rotated about the longitudinal axis 50 and relative to the main tube 214.

The main tube 214 includes a first end 234, a second end 238, an inner cavity 242 extending between the first end 234 and the second end 238, and a slot 246. The first end 234 includes an engagement surface 250, and the second end 238 is disposed at an opposite end of the main tube 214 from the first end 234 and includes an engagement surface 254. The slot 246 is formed through the main tube 214 such that the slot 246 extends from an outer surface 258 of the main tube 214 and into the inner cavity 242. The slot 246 extends generally between the first end 234 and the second end 238 and is substantially parallel to the longitudinal axis 50.

The track tube 218 is slidably and rotatably received by the main tube 214 such that an inner surface 262 of the track tube 218 opposes the outer surface 258 of the main tube 214 when the track tube 218 is installed on the main tube 214.

The track tube 218 includes a first end 266, a second end 270, a first slot 274, a second slot 278, and a third slot 282. The first end 266 includes a collar 286 having an engagement surface 290 and a bore 294. The second end 270 is disposed on an opposite end of the track tube 218 than the first end 266.

Figure 6:
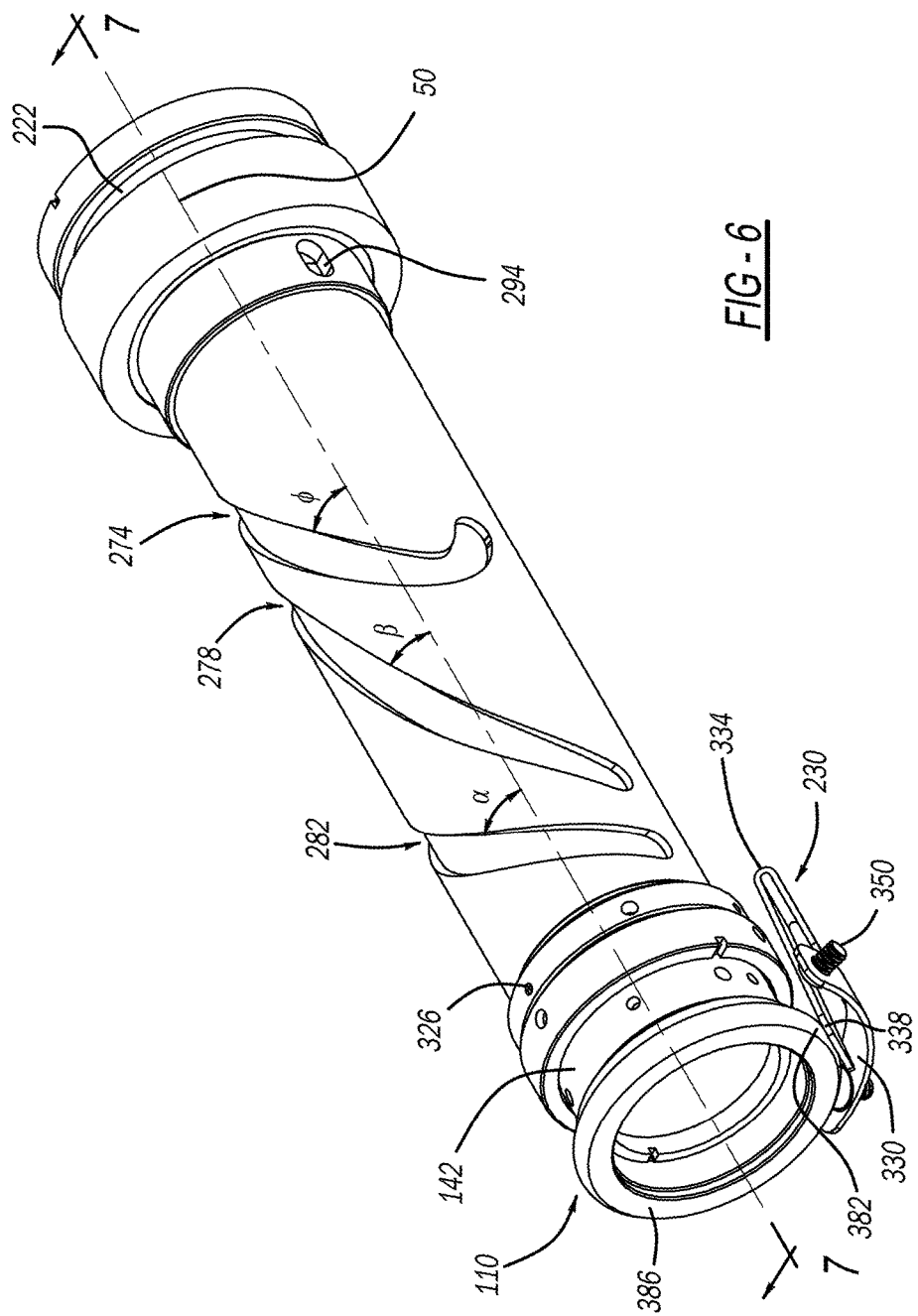
FIG. 6 is an perspective view of the relay assembly of FIG. 1.

The first slot 274, the second slot 278, and the third slot 282 are each formed at an angle relative to the longitudinal axis 50. For example, and as shown in FIG. 6, the first slot 274 may be formed at an angle (φ) while the second slot 278 is formed at an angle (β) and the third slot 282 is formed at an angle (α). Each of the angles (φ, β, α) are acute angles such that the slots 274, 278, 282 are angled in the same direction as one another, as best shown in FIG. 6. The angles (φ, β, α) may be different acute angles to allow for different degrees of adjustment of the relay lens assemblies 126, 130, 134, as will be described in greater detail below. The slots 274, 278, 282 extend through the track tube 218 between the inner surface 262 and an outer surface 296.

The end cap 222 includes a spherical outer surface 298 and bores (not shown) extending through the end cap 222. The bores are located at spaced intervals around the end cap 222. The bores receive fasteners to attach the end cap 222 to the main tube 214 at respective attachment apertures of the main tube 214.

Figure 7:
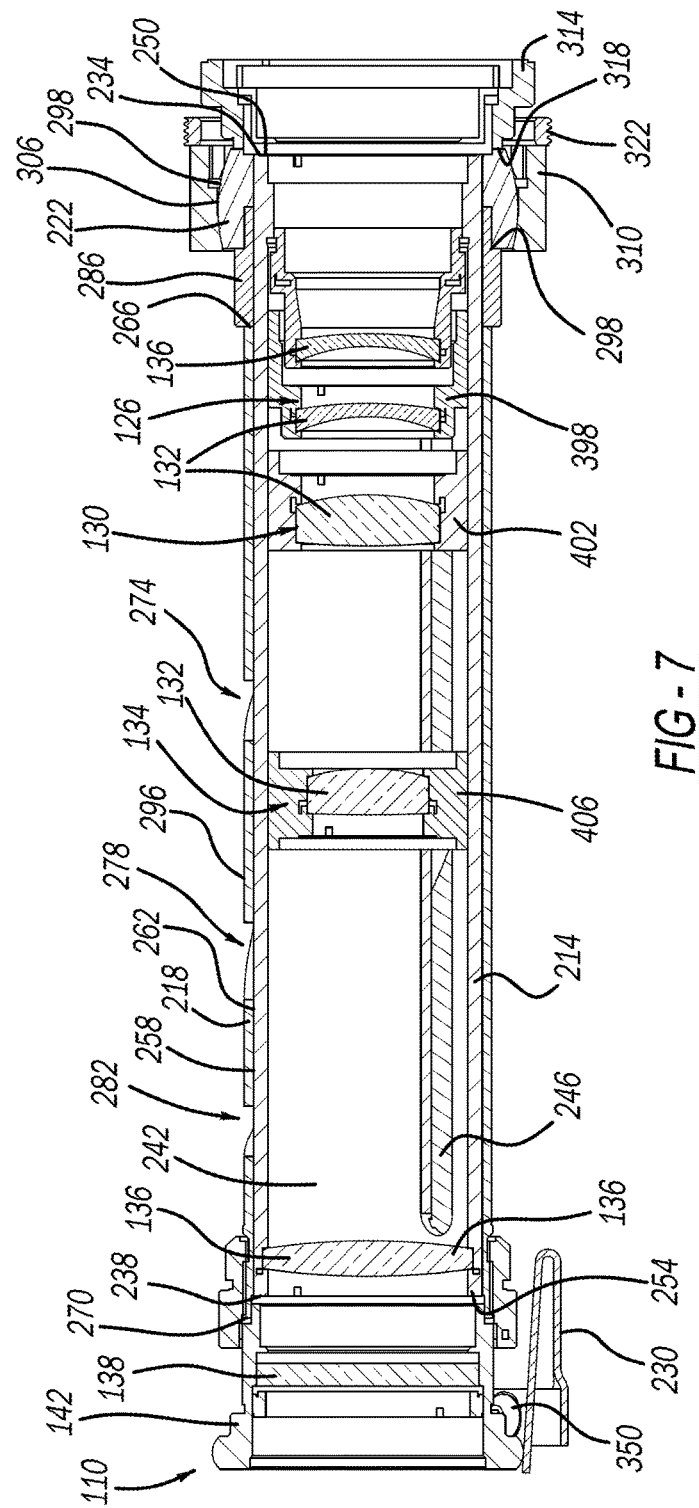
FIG. 7 is a cross-sectional view of the relay assembly taken along line 7-7 of FIG. 6.
Figure 8A:
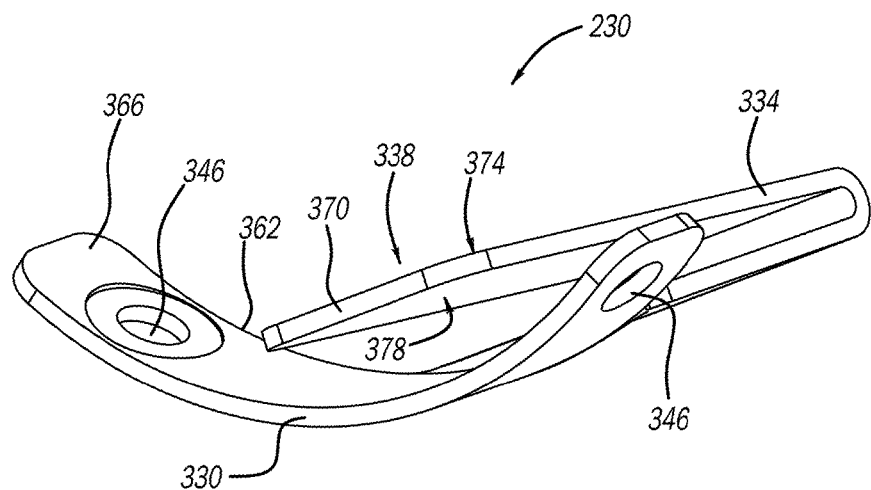
FIGS. 8A and 8B are different perspective views of a biasing element of the relay assembly of FIG. 6.
Figure 8B:
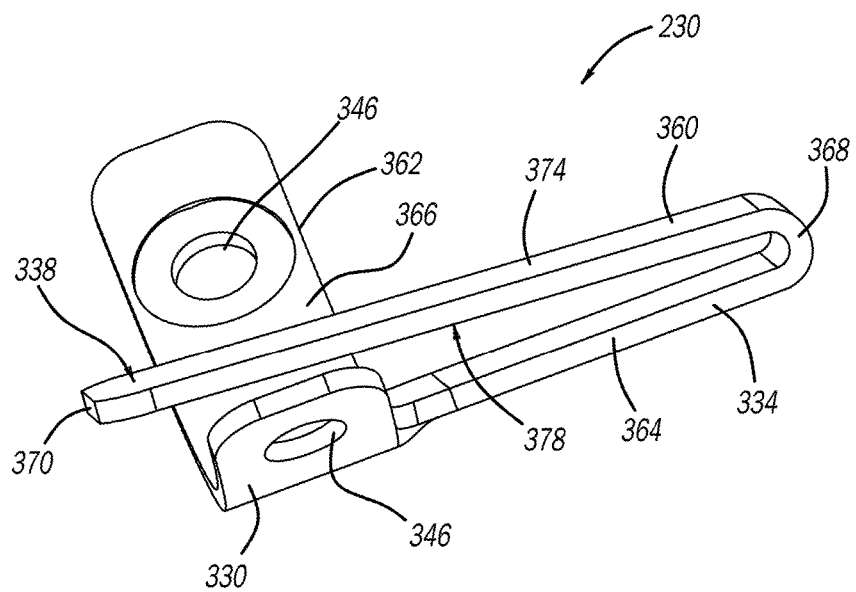

The end cap 222 is in engagement with a socket or seat 306 that is formed in a collar 310 disposed in the main body 34 of the housing 14. The socket or seat 306 may be fixed to or machined into the housing 14 and is disposed within the inner cavity 46. The spherical outer surface 298 of the end cap 222 is in engagement with the socket 306 of the housing 14 when the relay assembly 26 is installed in the inner cavity 46. The end cap 222 is retained within the inner cavity 46 and is maintained in contact with the socket 306 by a retainer 314 (FIGS. 2 and 7). The retainer 314 includes an engagement surface 318 that cooperates with the socket 306 of the collar 310 to provide a bearing surface for the end cap 222.

When the end cap 222 is in contact with the socket 306 of the collar 310 and with the engagement surface 318 of the retainer 314, the end cap 222 is permitted to rotate about and within the housing 14 about the socket 306. Rotation of the end cap 222 relative to and within the housing 14 likewise causes the main tube 214 and, thus, the track tube 218, to pivot about the end cap 222 relative to and within the inner cavity 46 of the housing 14. The main tube 214 and the track tube 218 pivot with the end cap 222, as the end cap 222 is fixed for movement with the main tube 214 via the fasteners and the track tube 218 is attached to the main tube 214 and extends generally between the end cap 222 and the reticle lens housing 270. Therefore, when a force is applied proximate to the second end 238 of the main tube 214, the main tube 214 and the track tube 218 move relative to the housing 14 and pivot about the end cap 222 as the spherical outer surface 298 of the end cap 222 is directed by and is in contact with the socket 306.

The retainer 314 includes a threaded portion 322 that may be threaded into the first end 54 of the main body 34, with the threaded portion 322 engaging threads 74, until the engagement surface 318 contacts the spherical outer surface 298 of the end cap 222. Namely, the retainer 314 may be inserted into the first end 54 until a desired force is exerted on the end cap 222 at the spherical outer surface 298 to provide a desired degree of resistance to movement of the spherical outer surface 298 relative to and within the socket 306. Once the desired position of the retainer 314 relative to the socket 306 of the collar 310 is achieved and the end cap 222 is positioned within the socket 306, the position of the retainer 314 relative to the housing may be fixed, for example, using Loctite®, another suitable adhesive, or another suitable method of fixing.

The reticle lens housing 142 of the reticle lens assembly 110 is fixed to the second end 270 of the track tube 218 by fasteners 326 which are received by bores (not illustrated) in the track tube 218. A combination of the reticle lens housing 142 and the end cap 222 position the track tube 218 along the main tube 214.

The biasing element 230 may include a mounting strap 330 and a V-shaped spring 334 having an engagement surface 338. The spring 334 may axially extend from the mounting strap 330 that attaches the spring 334 to an inner wall 342 of the main body 34 of the housing 14. The mounting strap 330 may be an arcuate-shaped plate having a plurality of apertures, or through-holes, 346 for receiving fasteners 350 to fix the mounting strap 330 to the inner wall 342. The mounting strap 330 may be arcuate-shaped to match a curved shape of a surface of the inner wall 342. The fasteners 350 may be inserted into the apertures 346 and subsequently inserted into respective apertures 354 formed in the inner wall 342. The apertures 354 in the inner wall 342 may include a series of threads 358 that threadably receive and engage the fasteners 350. Once the biasing element 230 is attached to the inner wall 342, the biasing element 230 is fixed relative to the main body 34 of the housing 14.

The spring 334 may be a flat spring that extends from a radially extending edge surface 362 of the mounting strap 330 and is folded over or bent such that the spring 334 extends back over itself (i.e, a first leg 360 of the spring 334 returns over a second leg 364 of the spring via a bend 368 in the spring 334) and overlaps the mounting strap 330 on an inboard side 366 of the mounting strap 330 opposite the inner wall 342. Because the spring 334 is only attached to the mounting strap 330 on a single end, the spring 334 provides a cantilevered structure. The folded-over shape of the spring 334 provides an expansion spring structure where the free height of the spring 334 is greater than the gap within which it is fit such that a radially outward bias is exerted on the reticle lens housing 142. The engagement surface 338 is located on a free end 370 of the spring 334 and on a radially inner side 374 of the spring 334 opposite a radially outer side 378 facing the mounting strap 330.

The spring 334 folds over and diverges away from the inner wall 342 of the housing 14 to allow the engagement surface 338 to abuttingly contact an outer surface 382 of the reticle lens housing 142 of the reticle assembly 110 within the inner cavity 46. The engagement surface 338 abuts the outer surface 382 of the reticle lens housing 142 at a location near a free end 386 of the reticle lens housing 142 and circumferentially spaced from the adjustment turrets 154, 158 to allow the biasing element 230 to simultaneously exert a force on each of the adjustment turrets 154, 158. For example only, with reference to FIG. 4, the adjustment turret 154 may contact a 12 o'clock position on the reticle lens housing 142, the adjustment turret 158 may contact a 9 o'clock position on the reticle lens housing 142, and the engagement surface 338 of the spring 334 may contact the reticle lens housing 142 at a position within a range of a 4 o'clock position to a 5 o'clock position, and, more preferably, halfway between the 4 o'clock position and the 5 o'clock position.

In one configuration, as illustrated best in FIG. 4, the spring 334 of the biasing element 230 is located such that an axis A extending perpendicular to, and through, the engagement surface 338 on the spring 334 is at an angle α and an angle φ relative to each of the adjustment turrets 154, 158 (particularly relative to a longitudinal axis B and C of the adjustment screws 174). For example only, each of angle α and angle φ may be preferably within a range of 45 degrees (45°) to one-hundred eighty-five degrees (185°) relative to the longitudinal axes B and C of the adjustment screws 174, and, most preferably, substantially equal to one-hundred thirty-five degrees (135°) relative to the longitudinal axes B and C of the adjustment screws 174. In other words, the spring 334 is circumferentially offset from the adjustment turret 154 and from the adjustment turret 158 by approximately one-hundred thirty-five degrees (135°). Positioning the spring 334 in the foregoing manner allows the biasing element 230 to simultaneously exert a force against the adjustment screws 174 of the adjustment turrets 154, 158 which, in turn, allows for accurate adjustment of the reticle pattern. Preferably, positioning the spring 334 in the foregoing manner allows the biasing element 230 to simultaneously exert an equal force against each of the adjustment screws 174 of the adjustment turrets 154, 158.

For example, the lens(es) 138 of the reticle-lens housing 142 move in a direction away from the mounting strap 330 along direction (X) when the adjustment turret 154 causes the adjustment screw 174 to move along direction (X) and away from the mounting strap 330. Conversely, when the adjustment turret 154 causes the adjustment screw 174 to move in the direction (X) and toward the mounting strap 330, the spring 334 deflects and provides resistance to such motion to allow a user to obtain an accurate adjustment of the lens(es) 138 in the X-direction and, thus, an accurate adjustment of the reticle pattern.

Likewise, the lens(es) 138 of the reticle-lens housing 142 move in a direction away from the mounting strap 330 along direction (Y) when the adjustment turret 158 causes the adjustment screw 174 to move along direction (Y) and away from the mounting strap 330. Conversely, when the adjustment turret 158 causes the adjustment screw 174 to move in the direction (Y) and toward the mounting strap 330, the spring 334 deflects and provides resistance to such motion to allow a user to obtain an accurate adjustment of the lens(es) 138 in the Y-direction and, thus, an accurate adjustment of the reticle pattern.

Once the relay assembly 26 is installed in the housing 14 and the eyepiece 38 is attached to the first end 54, the optical sight 10 may be attached to the firearm 30 using the mounting portion 62, the mount 64, and/or the mounting feature 86. At this point, a user may use one or both of the adjustment turrets 154, 158 to account for elevation and windage by selectively causing the respective adjustment screws 174 to move further into or to further retract from the inner cavity 46, thereby adjusting a position of the reticle-lens housing 142 relative to and within the inner cavity 46 of the housing 14. As described above, the biasing element 230 exerts a force on the free end 386 of the reticle-lens housing 142 to bias the reticle-lens housing 142 and lens(es) 138 in a direction away from the mounting strap 330 and into contact with the adjustment turrets 154, 158 for accurate adjustment of windage and elevation. Such movement of the reticle-lens housing 142 relative to and within the inner cavity 46 likewise causes movement of the lens(es) 138 and, thus, adjusts a position of the reticle pattern relative to not only the housing 14 but also the firearm 30.

Movement of the reticle-lens housing 142 is permitted by applying a force on the reticle-lens housing 142 by the adjustment screw 174 which, in turn, causes the relay assembly 26 to pivot about the end cap 222. Such movement of the end cap 222 causes the spherical outer surface 298 to engage the socket 306. Such engagement between the spherical outer surface 298 and the socket 306 controls movement of the relay assembly 26 relative to and within the inner cavity 46.

An increase or decrease in magnification may be accomplished by applying a rotational force to an adjustment collar 390 rotatably supported by the housing 14 and by the attachment collar 42 (FIG. 2). The adjustment collar 390 includes a post 394 that is fixed for movement with the adjustment collar 390 and is received by the bore 294 of the track tube 218. Accordingly, when a rotational force is applied to the adjustment collar 390 and the adjustment collar 390 is moved relative to the housing 14, the force is transmitted to the track tube 218 by the post 394. The transmitted force likewise causes the track tube 218 to rotate relative to the housing 14 about the longitudinal axis 50.

Rotation of the track tube 218 about the longitudinal axis 50 adjusts a magnification of the optical sight 10 by causing the first relay lens assembly 126, the second relay lens assembly 130, and the third relay lens assembly 134 to move axially along the longitudinal axis 50. Namely, the first relay lens assembly 126, the second relay lens assembly 130, and the third relay lens assembly 134 each include a respective housing 398, 402, 406, each having a threaded bore 410. The bores 410 receive a fastener 412 having a bearing 416. Accordingly, when the fasteners 412 are installed in the bores 410, the bearings 416 are disposed generally between a head of the fasteners 412 and an outer surface of the respective housings 398, 402, 406.

Figure 5:
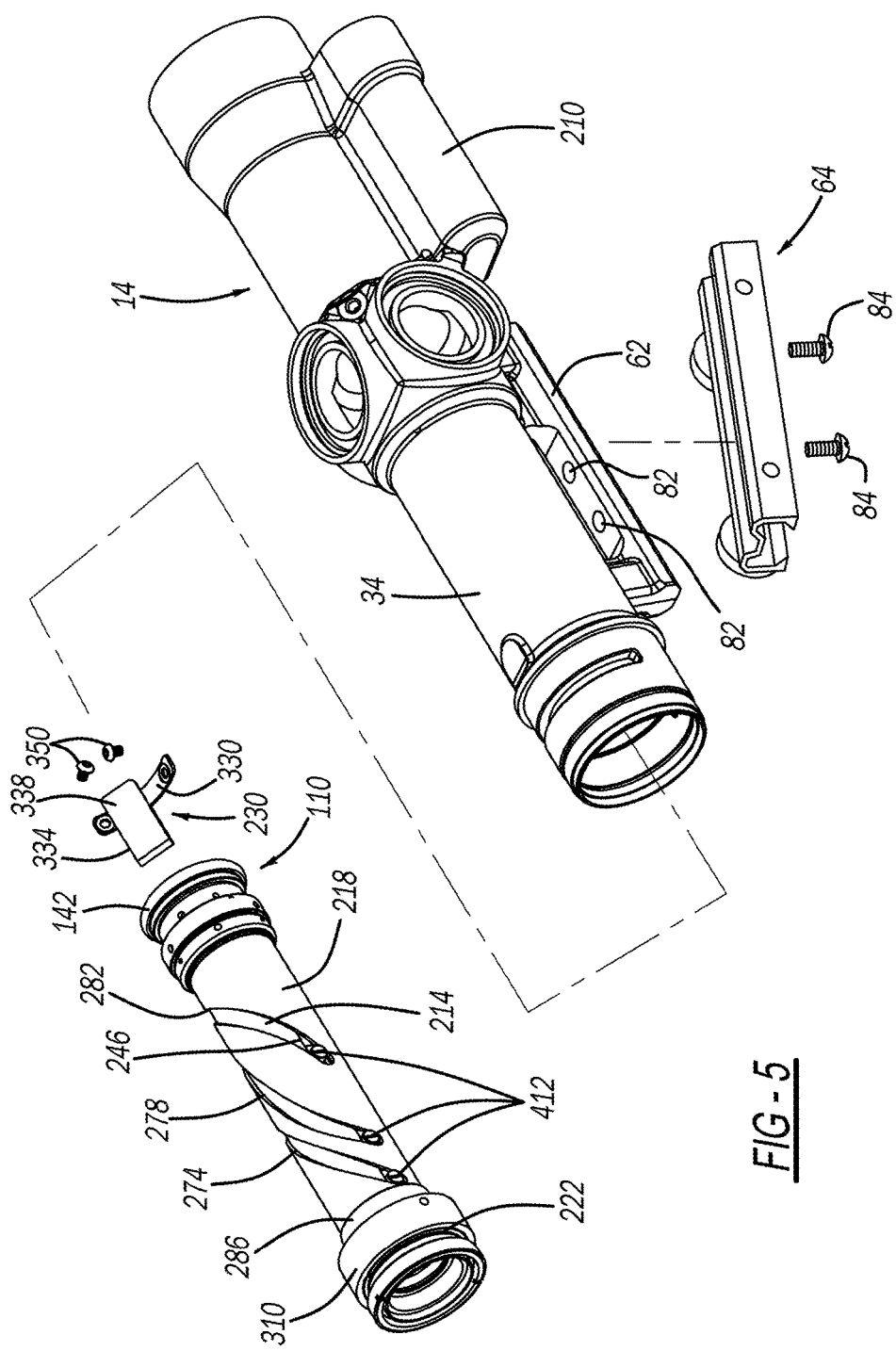
FIG. 5 is an exploded view of the housing and relay assembly of FIG. 1.

The bearings 416 are rotatably received within the respective slots 274, 278, 282 of the track tube 218 and are likewise received within the slot 246 of the main tube 214 (FIG. 5). The bearings 416 rotate about the respective fasteners 412 to allow the bearings 416 to move relative to and within the slots 274, 278, 282 of the track tube 218 and within the slot 246 of the main tube 214.

When a rotational force is applied to the adjustment collar 390 and the rotational force is applied to the track tube 218 via the post 394, the force is likewise transmitted to the bearings 416 due to the angled nature of the first slot 274, the second slot 278, and the third slot 282. Namely, as the track tube 218 rotates relative to and about the main tube 214, the bearings 416 traverse the first slot 274, the second slot 278, and the third slot 282. Such movement likewise causes the bearings 416 to move in a direction substantially parallel to the longitudinal axis 50 and within the slot 246 of the main tube 214.

Movement of the bearings 416 along the slot 246 of the main tube 214 likewise causes movement of the housings 398, 402, 406 in a direction substantially parallel to the longitudinal axis 50 and within the inner cavity 242 of the main tube 214. Such movement of the housings 398, 402, 406 in a direction substantially parallel to the longitudinal axis 50 and within the main tube 214 likewise causes movement of the respective lenses 132 associated with the housings 398, 402, 406 to move within and relative to the main tube 214. Movement of the lenses 132 causes an adjustment to the magnification of the optical sight 10. Once a desired magnification is achieved, the force applied to the adjustment collar 390 may be released and a position of the first relay lens assembly 126, the second relay lens assembly 130, and the third relay lens assembly 134 and, thus, the associated lenses 132 within the main tube 214, is maintained due to engagement between the bearings 416 within the respective slots 246, 274, 278, 282 of the main tube 214 and the track tube 218.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical sight comprising:
    a housing;
    a relay assembly having at least one optical element, a main tube, a track tube having at least one track, and a reticle assembly, said track tube selectively rotatable relative to and about said main tube to adjust an axial position of said at least one optical element within said main tube along an axis that is substantially parallel to a longitudinal axis of said main tube, and said reticle assembly having at least one optical element; and
    a biasing element including a mounting strap and a spring, wherein the mounting strap is fixed to an inner surface of said housing and said spring has an engagement surface that contacts said relay assembly, said engagement surface being on a radially inner side of said spring opposite a radially outer side facing said mounting strap and said biasing element exerting a force on said relay assembly when said relay assembly is installed in said housing.

2. The optical sight of claim 1, further comprising an adjustment assembly having at least one turret, wherein said at least one turret cooperates with said biasing element to adjust a position of said reticle assembly and said relay assembly.

3. The optical sight of claim 2, wherein said at least one turret includes a first turret and a second turret, and wherein said force exerted by said biasing element is at a one-hundred thirty-five degree angle relative to said force exerted by said first turret and said force exerted by said second turret.

4. The optical sight of claim 3, wherein said engagement surface of said biasing element contacts said relay assembly at a one-hundred thirty-five degree angle with respect to a contact point between said relay assembly and said first turret and at a one-hundred thirty-five degree angle with respect to a contact point between said relay assembly and said second turret.

5. The optical sight of claim 1, wherein said mounting strap is an arcuate-shaped plate having a plurality of apertures for receiving a plurality of fasteners to fix said mounting strap to an inner wall of said housing.

6. The optical sight of claim 5, wherein said spring extends from a radially extending edge surface of said mounting strap and is folded-over such that said spring extends back over itself and overlaps said mounting strap on an inboard side of said mounting strap opposite said inner wall of said housing.

7. The optical sight of claim 1, wherein said relay assembly includes a first end and a second end, and said engagement surface contacts said reticle assembly on said first end of said relay assembly.

8. The optical sight of claim 1, wherein said relay assembly includes a first end and a second end, said first end contacting said engagement surface, and said relay assembly pivoting on said second end opposite said first end.

9. The optical sight of claim 8, wherein at least one turret of an adjustment assembly cooperates with said biasing element to pivot said reticle assembly and said relay assembly with respect to said housing.

10. The optical sight of claim 9, wherein said at least one turret is a first turret having a first adjustment screw that moves in a first direction orthogonal to a longitudinal axis of said housing, said first adjustment screw exerting a force on said relay assembly which at least partially opposes said force exerted by said biasing element.

11. The optical sight of claim 10, wherein said at least one turret includes a second turret having a second adjustment screw that moves in a second direction orthogonal to said longitudinal axis of said housing and orthogonal to said first direction, said second adjustment screw exerting a force on said relay assembly which at least partially opposes said force exerted by said biasing element.

\* \* \* \* \*